US005465195A

United States Patent [19]

Jenner et al.

[11] Patent Number: 5,465,195

[45] Date of Patent: Nov. 7, 1995

[54] HEADLIGHT FOR MOTOR VEHICLES

[75] Inventors: Bert Jenner, Hamburg; Hans-Joachim Schmidt, Dusslingen; Giancarlo Chiaramonte, Bodelshausen; Wolfgang Lehmann, Bempflingen, all of Germany

[73] Assignee: Robert Bosch GmbH, Stuttgart, Germany

[21] Appl. No.: 97,088

[22] Filed: Jul. 23, 1993

[30] Foreign Application Priority Data

Jul. 31, 1992 [DE] Germany .......................... 42 25 303.9

[51] Int. Cl.[6] ................................ B60Q 1/04; F21V 9/06

[52] U.S. Cl. ........................... 362/61; 362/243; 362/294; 362/373

[58] Field of Search ............................. 362/61, 255, 256, 362/279, 282, 293, 294, 373

[56] References Cited

U.S. PATENT DOCUMENTS

| | | | |
|---|---|---|---|
| 2,280,402 | 4/1942 | Greppin | 362/293 |
| 4,479,173 | 10/1984 | Rumpakis | 362/293 |
| 4,774,636 | 9/1988 | Gaugel et al. | 362/61 |
| 4,951,178 | 8/1990 | Shirai et al. | 362/61 |
| 5,180,218 | 1/1993 | Ohshio | 362/61 |

FOREIGN PATENT DOCUMENTS

| | | | |
|---|---|---|---|
| 0285148 | 10/1988 | European Pat. Off. | 362/255 |
| 3932216 | 4/1991 | Germany | 362/293 |
| 4019587 | 2/1992 | Germany . | |
| 0152373 | 11/1979 | Japan | 362/294 |

*Primary Examiner*—Ira S. Lazarus
*Assistant Examiner*—Y. Quach
*Attorney, Agent, or Firm*—Michael J. Striker

[57] ABSTRACT

A headlight for motor vehicles has a reflector, a lamp support, a gas discharge lamp arranged in the reflector on the lamp support and including a region extending in the reflector and a glass cylinder which at least partially absorbs light in UV-wavelength range and surrounds the region of the gas discharge lamp, and a light stop which at least partially screens a light emitted by the gas discharge lamp. The light stop is at least indirectly mounted on the reflector, the glass cylinder is held on the light stop at least in its end region facing a light direction, the glass cylinder adjoins the lamp support, and the lamp support and the gas cylinder are arranged so that an opening leading to an interior of the glass cylinder remains between the lamp support and the glass cylinder.

12 Claims, 4 Drawing Sheets

HEADLIGHT FOR MOTOR VEHICLES

BACKGROUND OF THE INVENTION

The present invention relates to a headlight for motor vehicles.

More particularly, it relates to a headlight for a motor vehicle, which has a reflector, a gas discharge lamp arranged inside the reflector, a glass cylinder surrounding the gas discharge lamp at least partially and absorbing the light in UV wavelength region, and a light stop for partial screening of the light.

Headlights of the above mentioned general type are known in the art. One of such headlights is disclosed for example in the German reference DE 40 19 587 A1. The headlight has a reflector in which a gas discharge lamp is arranged on a lamp support, the gas discharge lamp in its region extending in the reflector is surrounded at a distance by a glass cylinder formed as an encasing bulb. The encasing bulb absorbs light in the UV-wavelength range at least partially, so that no damaging UV radiation can be emitted from the headlight. The encasing bulb is mounted on the lamp support by several spring arms. Moreover, a light stop is provided in order to partially screen the light emitted by the gas discharge lamp, for avoiding blinding or glaring. The light stop is formed by a light-impermeable coating applied on the encasing bulb. Due to the receptacle for the encasing bulb, the lamp support has a complicated shape which causes manufacturing difficulties especially when it is produced of ceramics. The encasing bulb is formed as a closed element, so that an air exchange between its inner chamber in which the gas discharge lamp is arranged, and the surrounding area is not possible. As a result, very high temperatures can develop in the inner chamber.

SUMMARY OF THE INVENTION

Accordingly, it is an object of the present invention to provide a headlight of the above mentioned type, which avoids the disadvantages of the prior art.

In keeping with these objects and with others which will become apparent hereinafter, one feature of the present invention resides, briefly stated, in a headlight, in which the light stop is at least partially mountable on the reflector, the glass cylinder at least in its end region which faces the light direction is held on the light stop, and the glass cylinder adjoins the lamp support, while between the lamp support and the gas cylinder an opening to the interior of the glass cylinder is provided.

When the headlight is designed in accordance with the present invention, then due to the mounting of the encasing bulb on the light stop, the lamp support can be formed simply and moreover an air exchange is possible between the chamber limited by the encasing bulb and its surrounding area so as to provide cooling.

In accordance with another feature of the present invention the end side of the glass cylinder which faces the light direction is covered by the light stop, and another opening is provided between the glass cylinder and the light stop to the interior of the glass cylinder. In this construction an axial air flow through the glass cylinder is obtained, which provides for an efficient cooling.

In accordance with still a further feature of the present invention, the lamp support is composed of ceramics and held on the reflector by means of a holding body composed of an elastic material, and the glass cylinder is held in its end region which faces away of the light direction on the holding body. In such a construction the glass cylinder is additionally supported on the holding body of the lamp support and is therefore retained in a vibration free manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
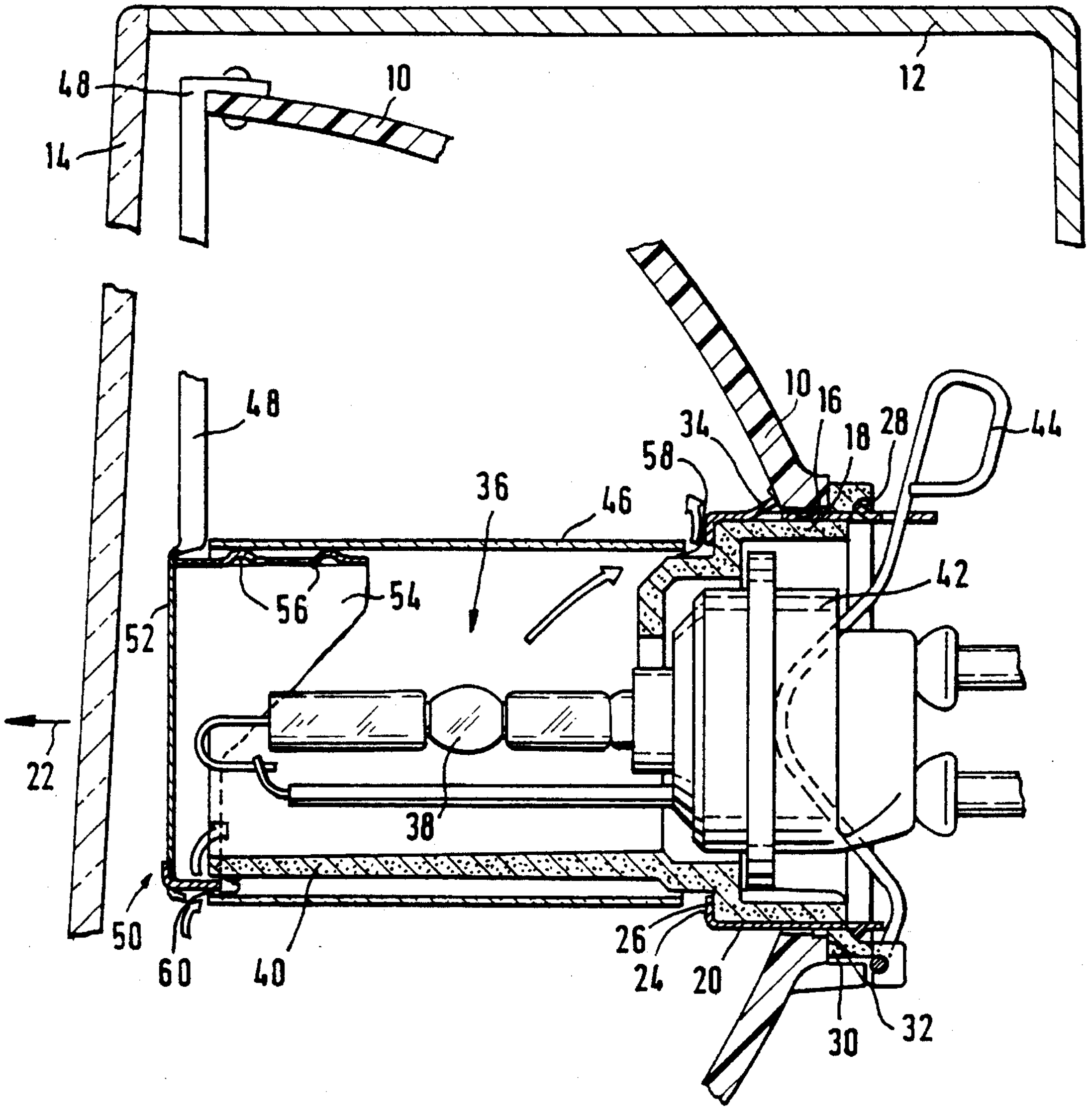
FIG. 1 is a view showing a longitudinal section of a headlight for motor vehicles in accordance with one embodiment of the present invention.

A headlight for motor vehicles shown in FIGS. 1–4 has a reflector 10 which can be composed of synthetic plastic material or metal. The reflector 10 can be arranged adjustably in a housing 12 which is mounted on the chassis of the motor vehicle, or can be adjustably connected with the chassis by a not shown supporting frame. The light outlet opening of the reflector 10 is closed with a light disc 14 which is mounted on a front edge of the housing 12. However, the light disc can be also mounted on the front edge of the reflector 10 as shown in FIG. 1*a*. The light disc 14 can be composed of glass or synthetic plastic material, and is provided with optically effective elements for influencing the light reflected by the reflector. The reflector 10 in its apex region is provided with an opening 16 in which a lamp support 18 is inserted.

The lamp support 18 is composed preferably of ceramics and is held on the reflector 10 by a metallic holding body 20. The holding body 20 surrounds the lamp support 18 and in its end region 24 which faces in the light direction 22 is bent radially inwardly over a shoulder 26 of the lamp support 18. The holding body 20 has also several radially outwardly extending spring hooks 28 which are distributed over its periphery. The spring hooks 28 engage on the lamp support 18 a projection which faces opposite to the shoulder 26. Therefore the holding body 20 is mounted on the support by its bent end region 24 and the spring hooks 28. The lamp support 18 abuts with its flange 30 against the edge 32 of the reflector 10 in the light direction 22. In the region of the holding body 20 which extends into the reflector 10, several spring hooks 34 which are distributed over its periphery extend radially outwardly and with the inner surface of the reflector 10. Thereby the lamp support 18 together with the holding body 20 is mounted on the reflector 10.

The lamp support 18 supports a gas discharge lamp 36 which has a glass body 38 forming a discharge vessel and extending into the reflector 10. The lamp support 18 has a cap 40 which extends in the light direction 22 substantially to the end of the glass body and laterally extends substantially to the height of the glass body 38. The cap 40 serves for forming a bright-dark limit in the light distribution produced by the headlight. The gas discharge lamp 36 has a socket 42 which is fixed in the lamp support 18 by a spring bracket 44. The spring bracket 44 can engage a part of the holding body 20 in an end position for fixing the gas discharge lamp 36.

The glass body 38 of the glass discharge lamp 36 which extends in the reflector 10, is surrounded by a coaxial glass cylinder 46 with a radial distance from it. Due to the glass cylinder 46, the light emitted by the gas discharge lamp 36 in UV-wavelength range is at least partially absorbed. A support 48 composed for example of metal is mounted on the edge of the reflector in particular on its upper edge in FIG. 1. The support 48 extends substantially vertically downwardly to the gas discharge lamp 36. In the lower edge region of the support 48, a light stop 50 is mounted. It is composed of metal and has a bottom 52 which closes the end side of the glass cylinder 46 and is provided with a cap shaped portion 54. The portion 54 extends in the glass cylinder 46 and surrounds the glass body 38 in this end region at least over a part of its periphery. The light stop 50 serves for partial screening of the light emitted by the gas discharge lamp 36, for preventing a blinding or dazzling by motor vehicles driving in an opposite direction. Several radial elastic spring arms 56 extend outwardly from the cap shaped portion 54 of the light stop 50 and are distributed over its periphery. They hold the glass cylinder 46. Preferably, two axially offset spring arms 56 are provided for holding the glass cylinder 46 over a greater part of its length.

A circular gap 58 remains axially and radially between the glass cylinder 46 and the lamp support 18. An air exchange between the inner chamber which is formed by the glass cylinder 46, the lamp support 18 and the light stop 50, and the surrounding area of the inner chamber is provided through the gap 58. Due to this air exchange the temperature in the inner chamber can be reduced. During a further development of the headlight, additionally a radial gap 60 can be formed between the periphery of the cap shaped portion 54 of the light stop 50 and the glass cylinder 46. Also an axial gap can be formed between the bottom 52 of the light stop 50 and the end side of the glass cylinder 46. Through these gaps also an air exchange with the surrounding areas is possible. Therefore an axial air flow through the gas cylinder 46 identified with the arrow in FIG. 1 and as a result an efficient cooling of the inner chamber and thus the gas discharge lamp 36 is possible.

Figure 1A:
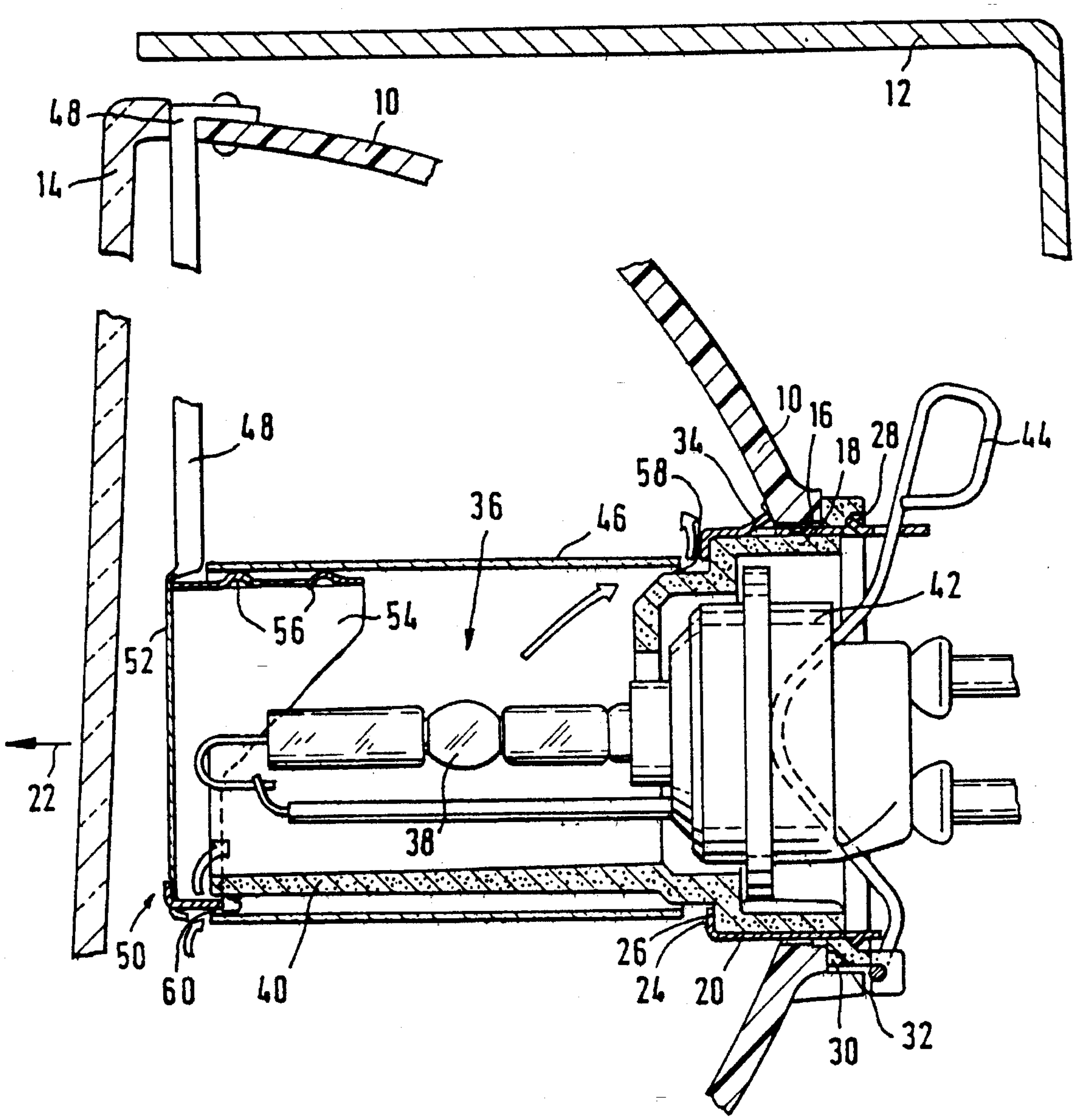
FIG. 1*a* shows a modification of the inventive headlight.
Figure 2:
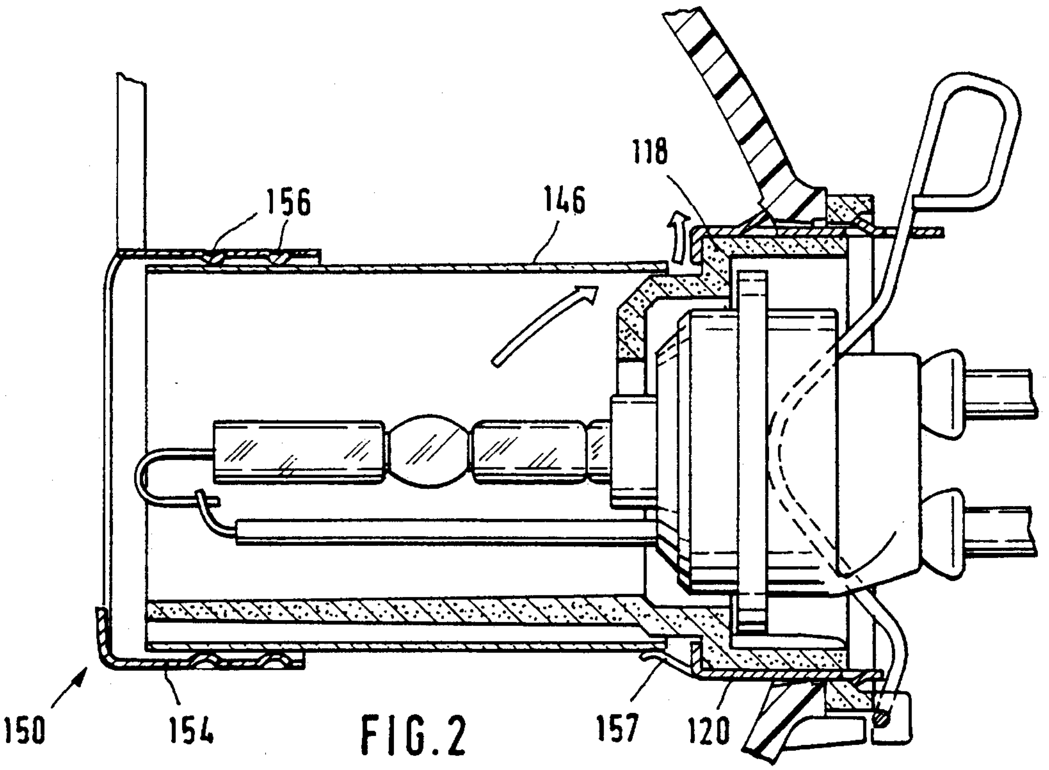
FIGS. 2 and 3 are views showing variants of the headlight of FIG. 1 with different light stops.

FIG. 2 shows a variant of the headlight of FIG. 1, in which the cap shaped portion 154 of the light stop 150 is arranged outside the glass cylinder 146 and surrounds it. The spring arms 156 of the light stop 150 extend radially inwardly and hold the glass cylinder 146. The glass cylinder 146 is held additionally in its end region facing the lamp support 118, by spring arms 157 which radially engage its outer surface and provided on the holding body 120. For this purpose several spring arms 157 are distributed over the periphery of the holding body 120 so that the glass cylinder 146 is held at its both ends and therefore is especially protected from vibrations. The additional mounting of the glass cylinder on the holding body can be provided both in the first embodiment and in the subsequent embodiments of the invention.

Figure 3:
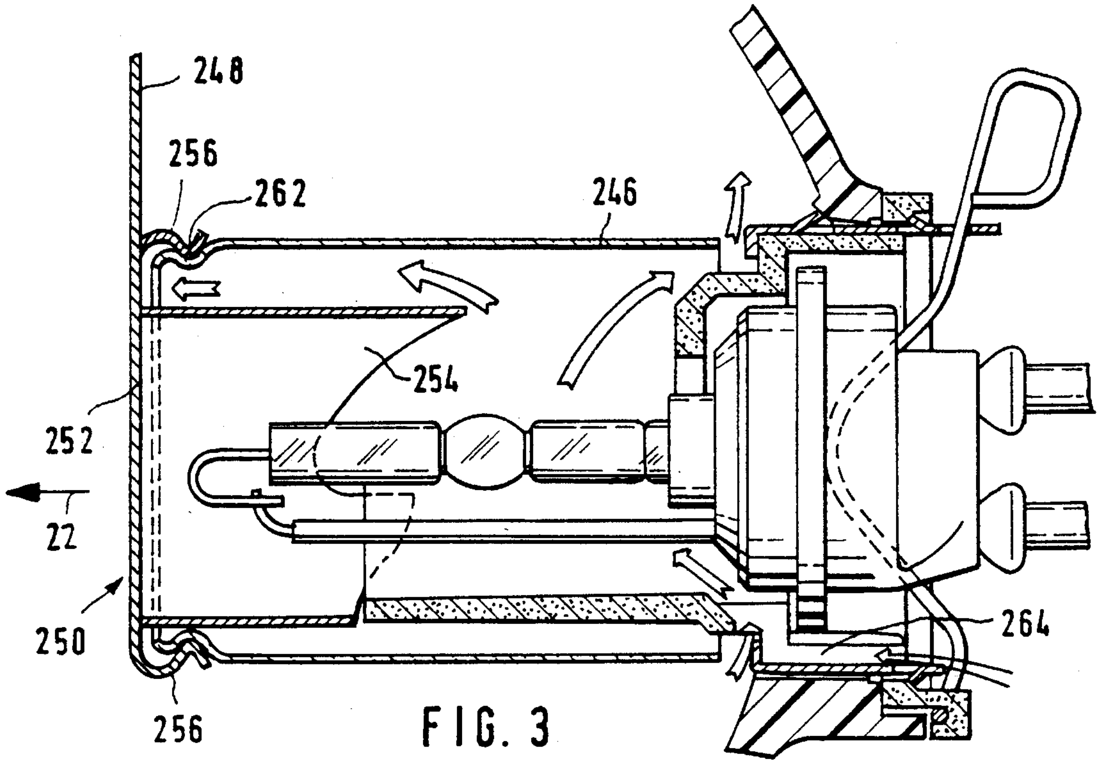

FIG. 3 shows a further variant of the headlight of FIG. 1 in which the spring arms 256 for holding the glass cylinder 246 are arranged on the support 248 which holds the light stop 250 and also on its bottom 252. The spring arms 256, as shown in FIG. 3, can engage the outer surface of the glass cylinder 252, or as shown in FIG. 2 can engage its inner surface. The glass cylinder 246 has a circular depression 262 in its region facing the light direction 22. The spring arms 256 engage in the depression 262 and thereby fix the glass cylinder 246 axially. The bottom 252 of the light stop 250 is substantially spaced axially from the end of the glass cylinder 246, so that an air exchange between the inner chamber and the surrounding area is possible. The cap shaped portion 254 of the light stop 250 extends into the glass cylinder 246. The lamp support 248 has recesses 264, by which the inner chamber is connected with the surrounding area. Also, in the headlight in accordance with the first embodiment as well as in accordance with the variant of FIG. 2, the depressions for ventilation of the inner chamber can be provided in the lamp support.

Figure 4:
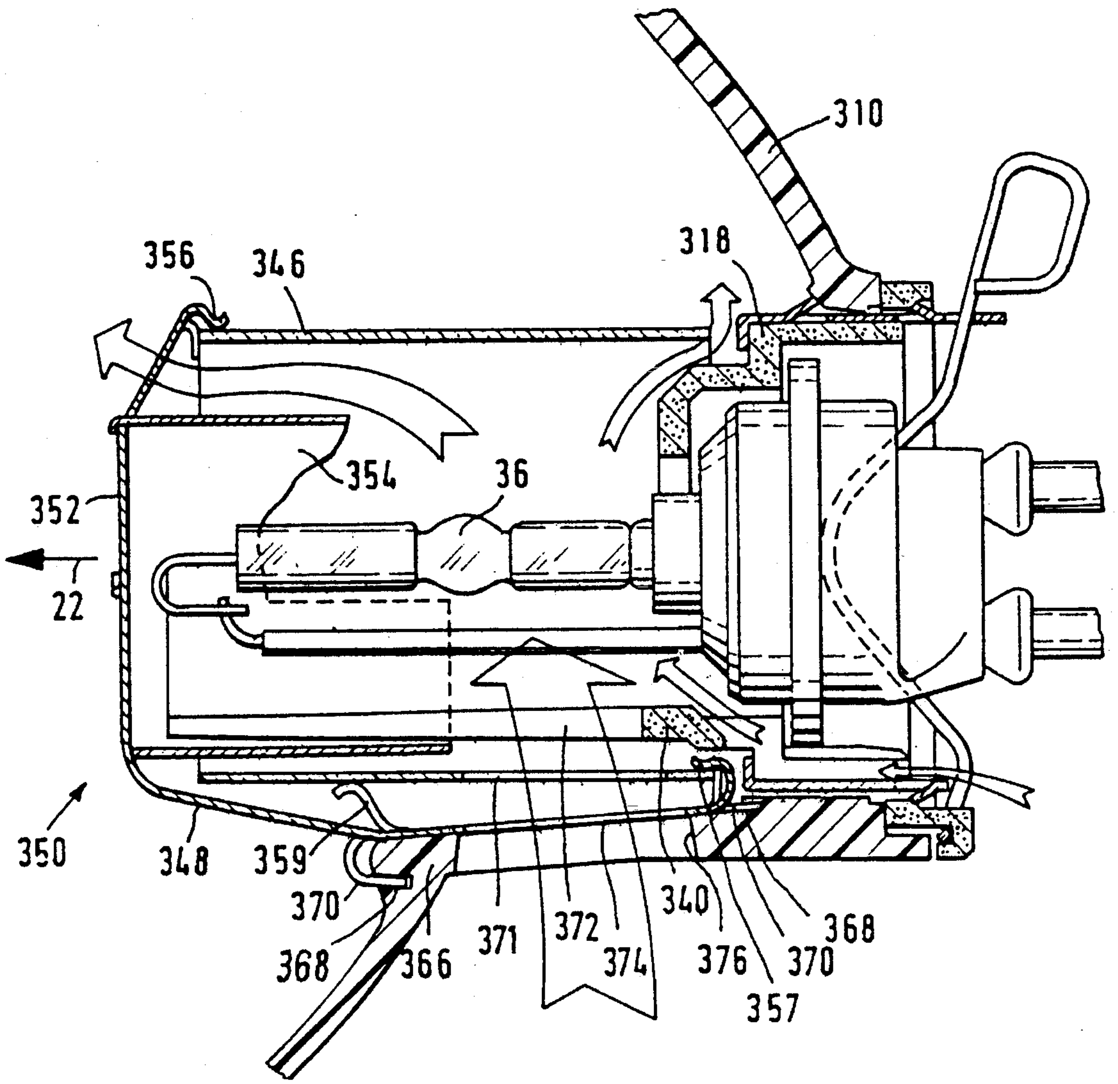
FIG. 4 is a view showing a headlight in accordance with a second embodiment of the invention.

A second embodiment of the headlight is shown in FIG. 4, in which the mounting of the light stop 350 of the reflector 310 as well as the holding of the glass cylinders 346 are performed differently from the above described embodiments. The reflector 310 has a projection 366 which extends in the light direction 22 and located under the gas discharge lamp 36. The projection 366 is provided for example when the reflector 310 is subdivided into one part which forms low beam, is associated with the gas discharge lamp 36, and another part which is located under this part, forms high beam and is associated with a special light source and is also offset in the light direction 22 with respect to the reflector part for the low beam. Slots 368 facing the light direction 22 are formed in the projection 366. The substantially horizontally extending support 348 with the spring hooks 370 engages in the slot 368 and holds the light stop 350. The slots 368 are arranged near the lamp support 318 and the end of the projection 366 facing the light direction 22, so that the support 348 is held reliably and cannot tilt under the action of weight of the light stop 350 and the glass cylinder 346. The light stop 350 is arranged in the end region of the support 348 which faces the light direction 22. Its cap shaped portion 354 extends in the glass cylinder 346. Several spring arms 356 project from the bottom 352 of the light stop 350 and are distributed over its periphery. The spring arms engage over the outer surface of the glass cylinder 346 and hold the light stop 350 on the glass cylinder. A spring arm 357 extends toward the glass cylinder 346 from the end region of the support 348 which faces the lamp support 318. The spring arm 357 overlaps the glass cylinder 346 and engages its inner surface so as to act radially. outwardly. In the end region of the projection 366 at least one spring arm 359 projects from the support 348 toward the glass cylinder 346, and the glass cylinder abuts against the spring arm 359. The glass cylinder 346 is held axially between the spring arms 356 and 357. A cap 340 of the lamp support 318 which corresponds to the cap 40 of FIG. I has one or several openings 372. In order to further improve the cooling of the inner chamber, the support 348 as well as the projection 366 can be provided each with an opening 374 and 376.

It will be understood that each of the elements described above, or two or more together, may also find a useful application in other types of constructions differing from the types described above.

While the invention has been illustrated and described as embodied in a headlight, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

We claim:

1. A headlight for motor vehicles, comprising a reflector; a lamp support; a gas discharge lamp arranged in said reflector and fixed to said lamp support and including a region extending in said reflector and a glass cylinder which at least partially absorbs light in UV-wavelength range and surrounds said region of said gas discharge lamp; and a light stop which at least partially screens a light emitted by said gas discharge lamp, said light stop being at least indirectly mounted on said reflector, said glass cylinder being held on said light stop at least in its first end region facing a light direction, always from said reflector said glass cylinder adjoining said lamp support, and said lamp support and said glass cylinder being arranged so that an opening leading to an interior of said glass cylinder remains between said lamp support and said glass cylinder, said glass cylinder having an end side which faces the light direction, always from said lamp support said end side of said glass cylinder being covered by said light stop, and an opening leading to an interior of said glass cylinder remains between said glass cylinder and said light stop.

2. A headlight as defined in claim 1, wherein said light stop has a cap shaped portion surrounding said glass cylinder; and further comprising radial spring arms extending from said cap shaped portion of said light stop and engaging an outer surface of said glass cylinder so as to hold the glass cylinder.

3. A headlight as defined in claim 1, and further comprising a support by which said light stop is mounted on said reflector; and spring arms arranged on said support and engaging said glass cylinder so as to hold the glass cylinder.

4. A headlight as defined in claim 3, wherein said glass cylinder is provided with an annular depression arranged so that the spring arms engage in said annular depression.

5. A headlight as defined in claim 1, wherein said glass cylinder, said light stop and said lamp support together form a chamber, said lamp support being provided with a plurality of openings communicating said chamber with an outside area.

6. A headlight as defined in claim 1, wherein said lamp support is composed of ceramics; and further comprising a holding body composed of elastic material and arranged so that said lamp support is held by said holding body on said reflector.

7. A headlight as defined in claim 6, wherein said glass cylinder has an end region facing opposite to a light direction and is held by said holding body.

8. A headlight as defined in claim 1, and further comprising a support, said reflector having a projection which extends in a light direction so that said light stop is mounted by said support on said projection.

9. A headlight as defined in claim 8, wherein said glass cylinder has second end region, said support has spring arms engaging said first and second end regions of said glass cylinder.

10. A headlight as defined in claim 1, wherein said glass cylinder has a peripheral wall provided with at least one opening.

11. A headlight as defined in claim 1, wherein said cylinder has a peripheral wall provided with a plurality of openings.

12. A headlight for motor vehicles, comprising a reflector; a lamp support; a gas discharge lamp arranged in said reflector and fixed to said lamp support and including a region extending in said reflector and a glass cylinder which at least partially absorbs light in UV-wavelength range and surrounds said region of said gas discharge lamp; a light stop which at least partially screens a light emitted by said gas discharge lamp, said light stop being at least indirectly mounted on said reflector, said glass cylinder being held on said light stop at least in its end region facing a light direction, always from said reflector said glass cylinder adjoining said lamp support, and said lamp support and said glass cylinder being arranged so that an opening leading to an interior of said glass cylinder remains between said lamp support and said glass cylinder, said light stop having a cap shaped portion extending into said glass cylinder; and spring arms radially projecting from said cap shaped portion and engaging an inner surface of said glass cylinder so as to hold said glass cylinder.

* * * * *